United States Patent Office 3,567,688
Patented Mar. 2, 1971

3,567,688
POLYOXYMETHYLENIC COPOLYMERS
Gianfranco Pregaglia, Milan, Marco Binaghi, Varese, and Paolo Roffia, Mantova, Italy, assignors to Montecatini Edison S.p.A., Milan, Italy
No Drawing. Continuation-in-part of application Ser. No. 507,235, Nov. 10, 1965. This application Mar. 19, 1968, Ser. No. 714,354
Int. Cl. C08g 1/16
U.S. Cl. 260—67
7 Claims

ABSTRACT OF THE DISCLOSURE

Polyoxymethylenic copolymers having superior properties, consisting of repeating oxymethylenic units and of oxyalkylenic units formed by opening of substantially only one of the rings of 2,3-ethylene-dioxydioxane.

Polyoxymethylenic copolymers prepared by reacting trioxane with 2,3-ethylenedioxydioxane.

FIELD OF THE INVENTION

The present invention relates to new copolymers having supreior chemical and physical properties, more particularly to copolymers consisting of repeating oxymethylenic units and of oxyalkylenic units formed by opening of substantially only one of the rings of 2,3-ethylenedioxydioxane, and to the process of preparation thereof.

This is a continuation-in-part of our application, now abandoned, Ser. No. 507,232, filed on Nov. 10, 1965, in which we disclosed copolymers of trioxane and cyclic diacetals, including 2,3-ethylenedioxydioxane, and that the copolymerizates which are polyoxymethylenic polymers containing oxyalkylenic units resulting from the opening of only one acetalic group of the diacetal are linear, thermally stable copolymers.

The present application is concerned, more particularly, with the polyoxymethylenic polymers of our invention which are solid, high-melting polyoxymethylenic copolymers containing oxyalklenic units formed by opening of substantially only one of the rings comprised in the molecule of 2,3-ethylenedioxydioxane having the formula

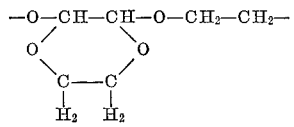

i.e., the copolymers of our invention which consist of linear sequences of oxymethylenic units —CH$_2$—O—, separated by units

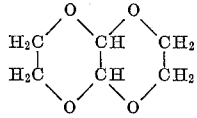

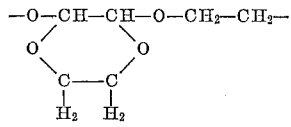

and being substantially free of side chains formed by opening of the other ring comprised in the 2,3-ethylenedioxydioxane molecule.

THE PRIOR ART

Polymers having repeating —CH$_2$O— units have been known for several years and can be prepared by polymerization of formaldehyde or of trioxane, the cyclic trimer of formaldehyde.

It is also possible to prepare polymers which contain units different from —CH$_2$O—. These products can be obtianed by copolymerizing trioxane with particular monomers, e.g., cyclic anhydrides or expoxides. In this case the polyoxymethylenic polymers contain in the chain units of the —O—CH$_2$—CH$_2$— type and are characterized by a thermal stability higher than that of the polyoxymethylenic homopolymers.

DESCRIPTION OF THE PREFERRED EMBODIMENTS

The copolymers of our invention with which the present application is more particularly concerned, and the macromolecules of which consist of linear sequences of oxymethylenic units —CH$_2$—O— separated by the units are prepared by reacting trioxane with 2,3-ethylenedioxydioxane in a molar ratio of from 2:1 to 333:1, in contact with from 0.0001 to 0.1 part, preferably from 0.01 to 0.01 part, by weight, per 100 parts by weight of the trioxane, of a Lewis acid catalyst containing chlorine or fluorine atoms, at a temperature of from 30° C. to 120° C., preferably from 50° C. to 90° C.

The copolymers contain the oxymethylenic units and the units formed by opening of substantially only one of the two rings comprised in the 2,3-ethylenedioxydioxane molecule, in a ratio of 6:1 to 1000:1, and have, as compared to polyoxymethylenic homopolymers, increased thermal stability and improved chemical and physical characteristics. The copolymers exhibit remarkably higher elasticity in the molten state, a property which distinguishes them, also, from previously known polyoxymethylenic copolymers.

The copolymers, which are normally solid, thermoplastic resins, have a substantially linear structure. The linearity results from the fact that, during the copolymerization the oxymethylenic units arrange themselves in linear sequences and substantially only one of the two rings comprised in each molecule of the 2,3-ethylenedioxydioxane is opened to form the oxyalkylenic units combined in the main chain and separating the sequences of repeating oxymethylenic units. These copolymers show only a relatively few side chains resulting from opening of the second ring comprised in the 2,3-ethylenedioxydioxane, indciating that, in the case of 2,3-ethylenedioxydioxane, once one of the two rings comprised in the molecule thereof is opened, the other ring of the 2,3-ethylenedioxydioxane is less prone to enter into the reaction. The substantially linear structure of the copolymers is evidenced by the good processing characteristics thereof, and the presence of a relatively few side chains is evidenced by the high degree of elasticity exhibited by the copolymers in the molten state.

The combined properties of thermal stability and marked elasticity in the molten state enable the copolymers to maintain the shape imparted thereto during various shaping operations. The copolymers are particularly adapted to being extruded to pipes and films, and for use in blow molding processes.

The Lewis acid type catalysts used in preparing the copolymers are those known in the art for the polymerization of trioxane. Suitable Lewis acid type catalyst containing fluorine or chlorine atoms include antimonium fluoride, antimonium fluoroborate, phosphorus pentachloride, FeCl$_3$, BF$_3$, SnCl$_4$ etc.

The preferred catalyst is BF$_3$, alone or complexed with organic compounds in which oxygen or sulfur is the electron-donor atom, such as, for example

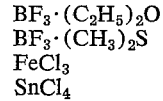

The trioxane must be used in anhydrous or substantially anhydrous condition.

The 2,3-ethylenedioxydioxane used as comonomer in preparing these copolymers is a solid, crystalline product having a melting point of 130° C. to 136° C. It must also be used in anhydrous or substantially anhydrous condition, in the present process.

In preferred embodiments of the invention, the 2,3-ethylenedioxydioxane is used in amounts of from 0.5 to 25, for instance from 1.5 to 15, parts by weight per 100 parts of trioxane.

The copolymerization of trioxane and 2,3-ethylenedioxydioxane according to our invention is preferably carried out in the absence of a solvent. It can also be performed in solution in hydrocarbons such as benzene and cyclohexane, in chloro-derivatives such as methylene chloride, or in nitro-derivatives such as nitrobenzene.

The copolymers have melting points of from about 150° C. to about 170° C., which is high for a copolymer, although lower than the normal melting point of homopolymeric polyoxymethylene.

The following examples are given to illustrate the invention.

EXAMPLE 1

145 g. of trioxane, made anhydrous by heating to the boiling point on a sodium-potassium alloy, are distilled under a nitrogen atmosphere in a 250 cc. flask provided with a side cock and an agitator. At the end of the distillation, 4.5 g. of 2,3-ethylenedioxane are added and the mass is heated to 70° C. until a homogeneous solution is obtained. By means of a hypodermic syringe, by piercing the rubber plug, 3 cc. of a 0.005 M solution of $FeCl_3$ are added. The polymerization starts after 1 minute of induction and leads to the gradual formation of a compact mass of polymer. After 3 hours at 70° C., the polymerization reaction is blocked by addition of a methanol excess.

The polymer so formed is reduced to a finely divided powder and is washed first with a warm ammonia solution and then with acetone.

After drying with a mechanical pump, 70 g. of polymer are obtained. A sample containing 0.5% of N-phenyl-B-naphthylamine is heated under vacuum to 180° C. for 2 hours in order to remove the unstable fraction corresponding to 13% and the residue is examined on the thermogravimetric balance at 225° C. under nitrogen. The weight loss, measured at 225° C., is not higher than 0.07% per minute.

EXAMPLES 2–5

The polymerization runs are carried out with the following modalities: 100 g. of anhydrous trioxane and variable amounts of 2,3-ethylenedioxydioxane are charged in glass vials.

The vials are washed with nitrogen, hermetically sealed and immersed in a thermostatic bath at 70° C., until the trioxane is completely melted.

0.60 cc. of a 1%—$BF_3(C_2H_5)O$ solution in anhydrous nitrobenzene are then introduced, the whole is vigorously agitated and kept at 70° C. for 30 minutes. After only a few seconds the mass of reactants solidifies.

At the end of the runs, the products obtained are poured into methanol containing 1–2% of ammonia, filtered and ground to obtain a fine powder, which is washed with boiling water and acetone and dried in an oven at 50° C. under vacuum.

The polymers are then treated at 160° C. in 10 parts of a 40:60 (parts by weight) water-isopropanol solution containing 0.2% of $NH_3$. After 20 minutes, the whole is cooled and the solid is recovered by filtration.

After washing and drying, the unstable fraction eliminated by the treatment is determined by weighing $$\frac{(\Delta P \text{ percent})}{P}$$

All the copolymers after the removal of the thermally unstable fraction as above described are subjected to the following determinations: $\eta_{in}$, weight loss per minute at 222° C. ($K_{222°}$), melt index and swelling in the molten state.

The characteristics of the copolymers obtained are reported in the following table.

Examples 2, 3, 4 and 5 show that, within a wide range of trioxane/ethylenedioxidioxane ratios, it is possible to obtain copolymers having good thermal stability and melt indexes suitable for processing. The thermal stability is expressed as the percent weight loss per minute of treatment at 222° C. under vacuum ($K_{222°}$), which is always ≤0.02.

The values of melt index vary as a function of the molecular weight of the copolymers and of their ethylenedioxydioxane content.

The melt index was determined by melting a copolymer sample in a standard cylinder (ASTM 1238) at the temperature of 190° C. and by extruding the same under a load of 12.5 kg. through an orifice having a diameter of 2 mm. and a height of 7.5 mm., and by weighing the copolymer that emerges through the orifice within a given time period.

TABLE

| Example | Comonomer | Parts by weight per 100 parts of trioxane | η Inherent [1] | ΔP percent P | ΔP percent $K_{222°}$ | Melt index 190°–12.5 kg. | Swelling of the molten product,[2] percent |
|---|---|---|---|---|---|---|---|
| 2 | 2,3-ethlyene-dioxydioxane | 2.4 | 0.89 | 8.7 | 0.02 | 15.0 | 100 |
| 3 | do | 4.8 | 0.90 | 8.0 | 0.02 | 7.0 | 150 |
| 4 | do | 10.0 | 0.53 | 7.1 | 0.01 | 36.0 | 200 |
| 5 | do | 15.0 | 0.91 | 6.2 | 0.01 | 1.4 | 250 |

[1] The inherent viscosity was determined in dimethylformamide at 150° C. at a concentration of 0.5 g./100 cc.
[2] This indicated the increase percentwise of the diameter of the extruded cylinder-shaped product in respect to the inner diameter of the extruder orifice.

As will be apparent, various changes in details may be made in the practice of this invention without departing from the spirit thereof. It is intended, therefore, to include in the scope of the appended claims, all such modifications in details as will be obvious to those skilled in the art from the description and working examples given herein.

What we claim is:

1. Normally solid binary copolymers of trioxane and 2,3-ethylenedioxydioxane the macromolecules of which consist of (1) sequences of repeating oxymethylenic units —$CH_2$—O—, separated by (2) oxyalkylene units

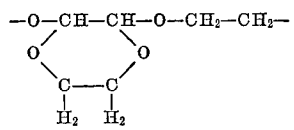

and are substantially free of side chains formed by opening of the second ring comprised in the molecule of 2,3-ethylenedioxydioxane, the ratio of units (1) to units (2) in the copolymer being from 6:1 to 1000:1, and said copolymers being substantially linear, having melting points of from 150° C. to 170° C., and further characterized in being thermally stable and highly elastic in the molten state.

2. A process for preparing the binary copolymers according to claim 1 and consisting substantially of the sequences of oxymethylenic units separated by the oxyalkylenic units formed by opening of substantially only one of the two rings comprised in the molecule of 2,3-ethylenedioxydioxane, which process comprises reacting trioxane with 2,3-ethylenedioxydioxane in a molar ratio of 2:1 to 333:1, at a temperature of from 30° C. to 120° C., and in contact with from 0.0001 to 0.1 part by weight per 100 parts of trioxane of a Lewis acid catalyst containing a halogen selected from the group consisting of chlorine and fluorine.

3. A process according to claim 2, in which the catalyst used is selected from the group consisting of $BF_3$, $BF_3 \cdot (C_2H_5)_2O$, $BF_3 \cdot (CH_3)_2S$, $FeCl_3$ and $SnCl_4$.

4. A process according to claim 2, in which the polymerization is carried out at a temperature of from 50° C. to 90° C.

5. A process according to claim 2, in which the catalyst is used in amount of from 0.001 to 0.01 part by weight per 100 parts of trioxane.

6. A process according to claim 2, in which 2,3-ethylenedioxydioxane is used in amounts of from 0.5 to 25 parts by weight per 100 parts of trioxane.

7. A process according to claim 2, in which 2,3-ethylenedioxydioxane is used preferably in amounts of from 1.5 to 15 parts by weight per 100 parts of trioxane.

References Cited
UNITED STATES PATENTS 3,372,146   3/1968   Sidi _____ 260—67FP WILLIAM H. SHORT, Primary Examiner L. M. PHYMES, Assistant Examiner U.S. Cl. X.R.

260—45.9, 45.95; 264—176

UNITED STATES PATENT OFFICE
CERTIFICATE OF CORRECTION

Patent No. 3,567,688                Dated March 2, 1971

Inventor(s) GIANFRANCO PREGAGLIA ET AL

It is certified that error appears in the above-identified patent and that said Letters Patent are hereby corrected as shown below:

In the heading to the printed specification, between lines 7 and 8 insert -- Claims priority, application Italy, November 12, 1964, 24,228/64 --.

Signed and sealed this 8th day of May 1973.

(SEAL)
Attest:

EDWARD M. FLETCHER, JR.
Attesting Officer

ROBERT GOTTSCHALK
Commissioner of Patent